United States Patent [19]
Eiglmeier et al.

[11] 3,884,924
[45] May 20, 1975

[54] PROCESS FOR THE PREPARATION OF ACENAPHTHENE-5,6-DICARBOXYLIC ACID IMIDE

[75] Inventors: Kurt Eiglmeier, Idstein, Taunus; Henning Lubbers, Schwalbach, Staunus, both of Germany

[73] Assignee: Hoechst Aktiengesellschaft, Frankfurt am Main, Germany

[22] Filed: Jan. 30, 1974

[21] Appl. No.: 437,993

[30] Foreign Application Priority Data
Feb. 1, 1973  Germany...................... 2304873

[52] U.S. Cl. ............................................. 260/281
[51] Int. Cl.² ........................................ C07D 39/00
[58] Field of Search .................................. 260/281

[56] References Cited
UNITED STATES PATENTS
3,455,922  7/1969  Hegar ................................ 260/281

Primary Examiner—Donald G. Daus
Assistant Examiner—Mary C. Vaughn
Attorney, Agent, or Firm—Curtis, Morris & Safford

[57] ABSTRACT
A process for the preparation of acenaphthene-5,6-dicarboxylic acid imide of the formula (1)

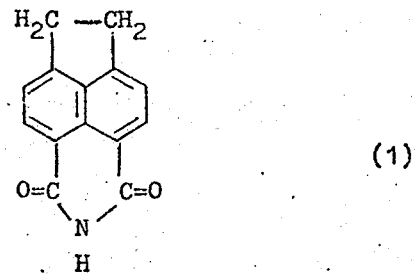

which comprises reacting acenaphthene of the formula (2)

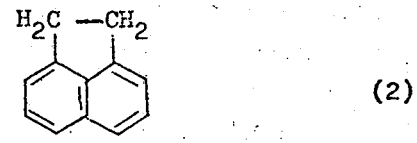

with an alkali metal cyanate in an at least 90% hydrofluoric acid at a temperature of from −10°C to 120°C, which represents a technically advantageous process because it allows the hydrofluoric acid used in excess to be recovered in contradistinction to known processes.

2 Claims, No Drawings

PROCESS FOR THE PREPARATION OF ACENAPHTHENE-5,6-DICARBOXYLIC ACID IMIDE

The present invention relates to a process for the preparation of acenaphthene-5,6-dicarboxylic acid imide.

It is known that acenaphthene-5,5-dicarboxylic acid imide can be prepared from acenaphthene and carbamic acid chloride in the presence of anhydrous aluminium chloride (cf. Agnew. Chemie 61 (1949), page 183)). It is further known that aromatic hydrocarbons may be condensed with finely ground potassium cyanate with the use of anhydrous hydrogen chloride according to Friedel-Crafts (cf. Friedlaender 24, 955). In both cases, the unstable and readily polymerizable carbamic acid chloride is stabilized by complex formation with aluminium chloride (cf. Angew. Chem. loc. cit.).

This invention now provides a process for the preparation of acenaphthene-5,6-dicarboxylic acid imide of the formula (1)

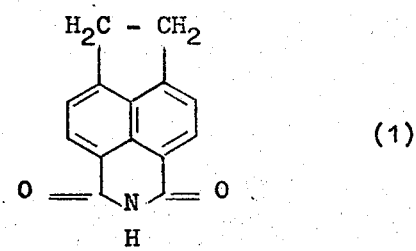

which comprises reacting acenaphthene of the formula (2)

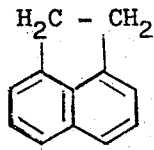

with an alkali metal cyanate in an at least 90% hydrofluoric acid at temperatures of from −10° to +120°C.

As alkali metal cyanate, there is preferably used sodium cyanate or potassium cyanate. A good yield is obtained, advantageously using an alkali metal cyanate excess of 5 to 60%, preferably 20 to 40%, over the required amount of 2 mols of cyanate per mol of acenaphthene. The hydrofluoric acid serving both as a reaction medium and as a reaction component advantageously has a concentration of at least 90% by weight, preferably from 95 to 100%, in particular 98 to 100%, and is used in amounts of from about 5 to 15, preferably 8 to 12 parts by weight per part by weight of acenaphthene.

The reaction is generally carried out by introducing an alkali metal cyanate and acenaphthene into the hydrofluoric acid, suitably at a temperature below the boiling point of hydrofluoric acid, preferably at a temperature of −10° to −30°C, and then heating the reaction mixture to the reaction temperature.

The reaction is carried out in two steps: At a temperature of about −10° to +40°C, preferably +10° to +20°C, acenaphthene-5-carboxylic acid amide is substantially formed. No special pressure vessels are required at this step. The second reaction step yielding the acenaphthene-5,6-dicarboxylic acid imide, however, requires temperatures above 60° to about 120°C, preferably +70° to +90°C. Temperatures above 100°C afford only slightly better yields.

It is advantageous to stir the reaction mixture thoroughly. The pressures occurring during the reaction correspond to the specific pressure of hydrofluoric acid. Therefore, the second reaction step requires the use of pressure vessels or autoclaves which, of course, have to be resistant to hydrofluoric acid, as are, for example, those made of steel.

Depending on the reaction temperature and on the concentration of the hydrofluoric acid, the overall reaction time is in the range of from about 1 hour to 2 days.

When the reaction is complete, excess hydrofluoric acid is advantageously distilled off and may be used for further reactions. The distillation residue is boiled with aqueous ammonia, cooled and suction-filtered. The crude acenaphthene-5,6-dicarboxylic acid imide obtained may be purified by extracting it with hot alkali metal hydroxide solution and then precipitating it with an acid.

The process of the invention affords a technical advantage over the prior art methods since hydrofluoric acid which has not been used up when the condensation is complete can be recovered, whilst the aluminium chloride used according to known methods is lost. Another advantage is that the recovered hydrofluoric acid is neither contaminated by water nor by hydrochloric acid, as it has been the case heretofore in the condensation reactions with acids or acid chlorides.

Although it has been known that Friedel-Crafts condensation reactions can be carried out in anhydrous hydrofluoric acid (cf. German Pat. No. 753.210), the instability of hydrocyanic acid or of carbamoyl fluoride presumably formed in hydrofluoric acid, which is polymerized at 60° − 70°C with the generation of gas (cf. Chem. Ber. 73, 179 (1940), seemed to frustrate any expectation of a satisfactory condensation, especially for the reason that the stabilizing effect of aluminium chloride used in former methods is lacking in the present case.

The compound prepared according to the invention is an interesting intermediate product for the synthesis of dyestuffs, optical brighteners and naphthalene-1,4,5,8-tetracarboxylic acid (cf. Angew. Chemie 61, 184 (1949); H. -R.Schweizer, "Kunstliche Organ. Farbstoffe und ihre Zwischenprodukte" (1964 Springer Publishing Company), pages 384 and 385).

The following Examples serve to illustrate the invention.

EXAMPLE 1

In a polyethylene vessel having a capacity of 1 Liter, first 78 g of sodium cyanate and then 61.6 g of acenaphthene were introduced portionwise, while stirring at −30°C, into 0.6 l of 98% hydrofluoric acid. Stirring was continued for 10 hours while slowly heating to room temperature. After having been conveyed to a steel shaking autoclave having a capacity of 1 liter, the reaction mixture was heated to 50°C for 5 hours and then to 80°C for 10 hours. After cooling, the hydrofluoric acid was distilled off, the crude product obtained was mixed while stirring with 1 l of 10% ammonia and slowly heated to 80°C, then suction-filtered when cool. 85 g of a crystallized product were obtained.

By extracting the product with 4N NaOH and adjusting the pH-value of the resulting solution to 8.5 by means of concentrated hydrochloric acid, 75 g of acenaphthene-5,6-dicarboxylic acid imide were obtained, which corresponded to a yield of 84.1% of the theory, calculated on acenaphthene. The melting point of the compound was above 350°C.

EXAMPLE 2

In a steel shaking autoclave having a capacity of 1 liter which was maintained at −10°C, first 65 g of sodium cyanate and then 61.6 g of acenaphthene were portionwise introduced into 0.6 l of anhydrous hydrofluoric acid. After having been shaken for 10 hours while being heated slowly to room temperature, the reaction mixture was gradually heated to 110°C and shaking was continued for 4 hours. After cooling, the product was worked up as disclosed in Example 1.

65 g of the compound of formula (1) were obtained, corresponding to a yield of 71% of the theory.

What we claim is:

1. A process for the preparation of acenaphthene-5,6-dicarboxylic acid imide of the formula (1)

(1)

which comprises the step of successively reacting acenaphthene of the formula (2)

(2)

with an alkali metal cyanate in an at least 90% hydrofluoric acid at a temperature of from −10°C to 40°C, and then at a temperature of from 60° to 120°C.

2. A process as claimed in claim 1, wherein the starting compounds are introduced into hydrofluoric acid prior to the reaction at a temperature of from about −10° to −30°C.

* * * * *